Aug. 17, 1954 M. BARRON 2,686,421
BRIDGE
Filed Jan. 7, 1947 8 Sheets-Sheet 1

INVENTOR.
MAURICE BARRON

Aug. 17, 1954

M. BARRON 2,686,421

BRIDGE

Filed Jan. 7, 1947

INVENTOR.
MAURICE BARRON
BY Harry Tunick
Attorney

Aug. 17, 1954  M. BARRON  2,686,421
BRIDGE
Filed Jan. 7, 1947  8 Sheets-Sheet 3
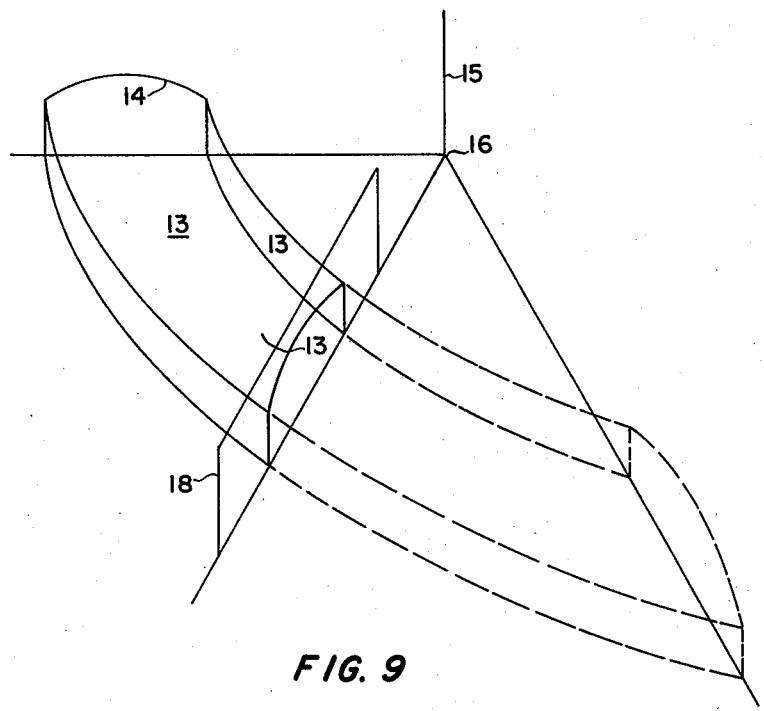
FIG. 9
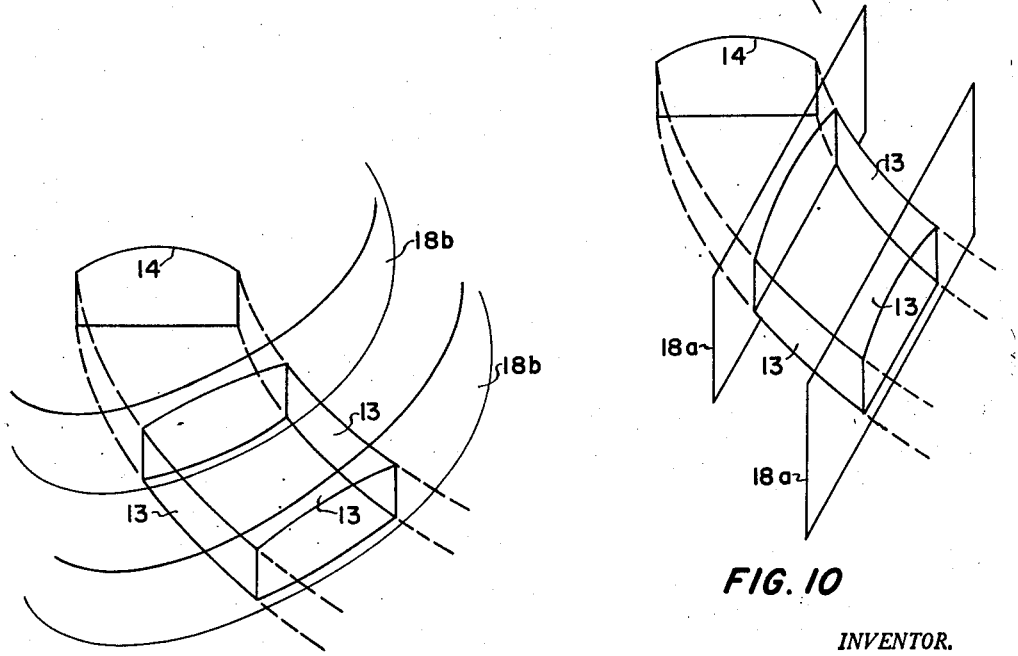
FIG. 11
FIG. 10
INVENTOR.
MAURICE BARRON
BY
Attorney Aug. 17, 1954  M. BARRON  2,686,421
BRIDGE Filed Jan. 7, 1947  8 Sheets-Sheet 4

INVENTOR.
MAURICE BARRON
BY

Aug. 17, 1954 M. BARRON 2,686,421
BRIDGE
Filed Jan. 7, 1947 8 Sheets-Sheet 7

INVENTOR.
MAURICE BARRON
BY

Aug. 17, 1954     M. BARRON     2,686,421
BRIDGE

Filed Jan. 7, 1947     8 Sheets-Sheet 8

INVENTOR.
MAURICE BARRON
BY
*Attorney*

Patented Aug. 17, 1954

2,686,421

UNITED STATES PATENT OFFICE 2,686,421

BRIDGE

Maurice Barron, White Plains, N. Y.

Application January 7, 1947, Serial No. 720,510

7 Claims. (Cl. 72—56)

My present invention pertains to highway bridge construction. It relates, more particularly, to reinforced concrete structures which are built monolithically from one foundation footing to the adjacent foundation footing, thereby forming a grade separation between the upper and lower roadways of two intersecting highways. Such structures are commonly called arches or rigid frame bridges according to the shape of the bridge opening as seen in elevation. Because concrete is easy to maintain and readily lends itself to architectural treatment, this type of bridge is usually and preferably made of that material.

The conventional reinforced concrete arch or rigid frame bridge is in the form of either a rectangular or a skewed structure in plan view. The rectangular structure usually results when two highways cross at or near right angles in which event the shape of the bridge in plan is a rectangle. The skewed structure results when the said rectangle is distorted into a parallelogram to accommodate an intersection other than a right angle intersection. The angular deviation of the parallelogram from the rectangular shape is called the "skew" angle.

The structural analysis of the rectangular arch (or rigid frame) bridge has been thoroughly developed, but because of its complicated nature the structural analysis of the skewed arch has not been advanced, as far as I am aware, beyond the evaluation of the effect of a constant skew. The art of design and construction of skewed arches and rigid frame bridges has, therefore, not progressed beyond the conventional plan shape of the parallelogram.

This conventional shape has been adapted for use when the lower roadway is slightly curved in plan. The use of this conventional form for curved lower roadways results in non-uniform width of sidewalks and distorted bridge openings, when each opening is considered in its relationship to the lower roadway. For sharply curved lower roadways, the arch or rigid frame bridge has usually been abandoned in favor of some other type of structure. In the few instances where the conventional skewed or rectangular structures were used to span sharply curved lower highways, the cost of each structure was inordinately increased, the skew angle was excessive and undesirable, the span required increased to undue proportions, the relationship between lower roadway and bridge opening was greatly distorted and undesirable, the hazard to traffic augmented, etc.

This situation is aggravated by modern high speed highways which require the physical separation of opposing traffic by center malls. This requirement results in a double span structure for grade separations at intersections having a center pier placed in the center mall which divides the opposing traffic. The plan form of conventional structures is either a rectangular or a parallelogram which necessitates the use of a straight center pier. Therefore, in addition to the aforementioned disadvantages there is, for double span structures spanning curved lower roadways, an additional disadvantage in that the curved center mall must be widened to accommodate the straight center pier. As a result, the right of way must frequently be widened and costs increased because of the additional land taken for highway use.

A general object of my invention is to provide a new type of reinforced concrete arch or rigid frame bridge which overcomes, in large measure, the foregoing disadvantages. Another object of the invention is to provide a roadway bridge construction affording comparatively increased strength, greater economy in the use of materials of construction, and increased capacity to resist loads imposed thereupon and strains induced therein. Another object is to effect, in bridge construction embodying the principles of my invention, great reductions in dead weight without sacrificing rigidity and strength. Briefly, this is accomplished by the provision of a structure curved in plan, in lieu of the rectangular or parallelogram construction heretofore employed. My invention effects considerable general savings and importantly reduces the cost of building the frame structure per se. It also reduces the cost of the foundations, footings, main walls, wing walls, and abutments. Further savings result from the reduction in land required and from the lessened amount of excavation needed for the lower roadway and for the bridge structure per se. In this matter of minimizing overall costs, as much as 18% may be saved by use of my invention. Thus, in the case of a roadway bridge normally requiring an expenditure of $200,000, a saving of approximately $30,000 may be obtained. This saving would, of course, be larger if rock excavation is necessary.

Another advantage of my invention resides in those instances where head room or clearance is a limiting factor. It will be found that a rigid frame or arch bridge embodying my invention will be advantageous and feasible where otherwise, with conventional construction, the bridge would be impractical or impossible to build.

2,686,421

3

Other objects, advantages and features of my invention will be self-evident to those skilled in the art as the more detailed description thereof proceeds. The latter will be given with the aid of the accompanying drawing wherein:

Figure 9 is a schematic geometric representation of the manner in which surfaces of revolution are combined to form a structure curved in plan, and the manner in which a radial cutting plane surface produces one face of the bridge.

Figure 10 is a schematic geometric representation of the manner in which surfaces of revolution are combined to form a structure curved in plan and the manner in which non-radial cutting planes produce both faces of the bridge. The cutting planes may be parallel or non-parallel.

Figure 11 is a similar representation but shows the faces produced by two curved cutting surfaces.

Figure 20A is a schematic representation of a continuous radial bar pattern adapted to a

4 structure having curved-in-plan abutments and straight parapet walls.

Figure 20:
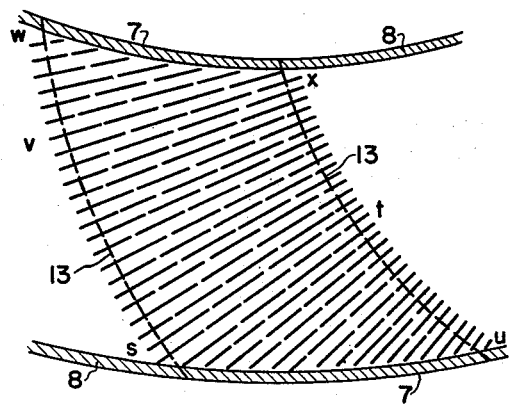
Figure 20 is a schematic representation of a continuous radial bar pattern adapted to a structure having both curved-in-plan abutment walls and curved-in-plan concentric parapet walls.
Figure 20A:
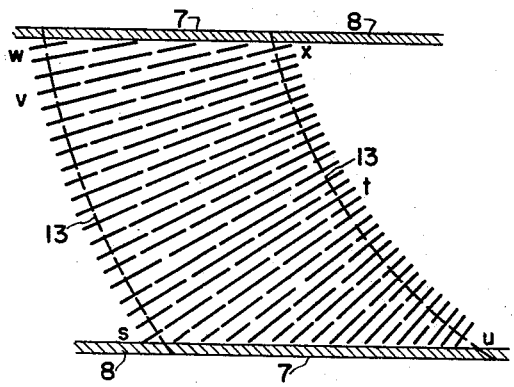
Figure 20B:
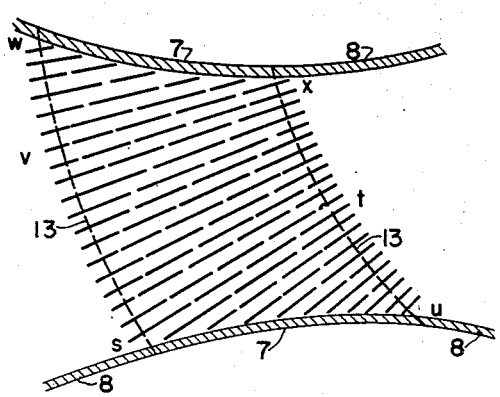

Figure 20B is a schematic representation of a continuous radial bar pattern adapted to a structure having curved-in-plan abutments and parapet walls which are curved-in-plan in opposite directions.

Figure 21:
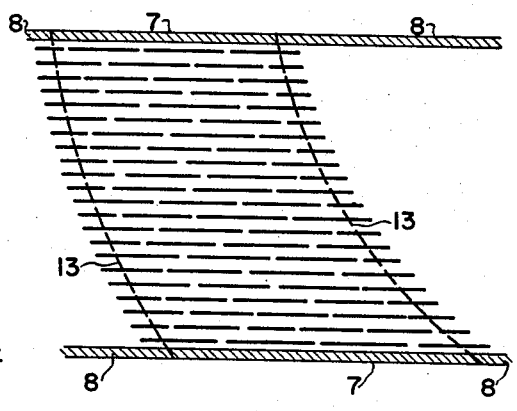

Figure 21 is a schematic representation of a pattern of bars parallel to the straight parapet walls of a structure having curved-in-plan abutment walls.

Figure 21A:
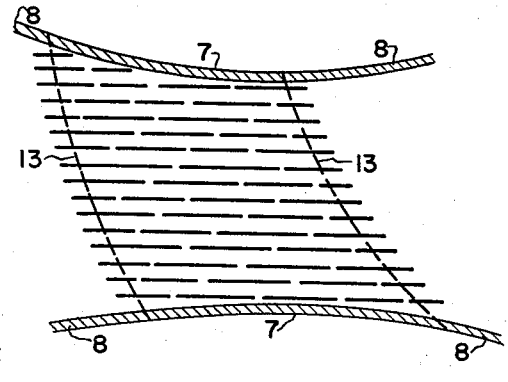
Figure 22:
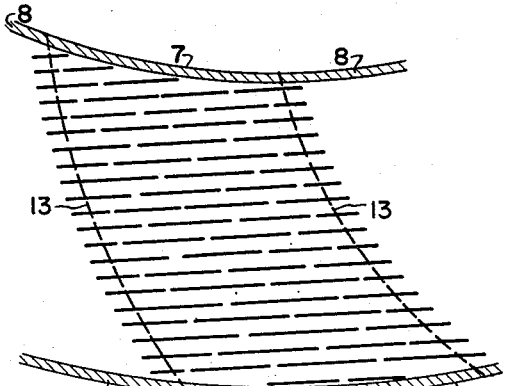

Figure 21A is a schematic representation of a parallel bar pattern which has been adapted to a structure having curved-in-plan abutment walls and parapet walls which are curved-in-plan in opposite directions, and Figure 22 is a schematic representation of a parallel bar pattern which has been adapted to a structure having curved-in-plan abutments and concentric curved-in-plan parapet walls.

Figure 1:
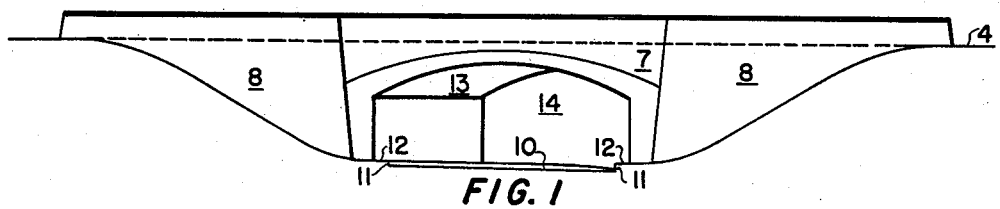
Figure 1 is a schematic representation in elevation of a rigid frame bridge embodying my invention.
Figure 2:
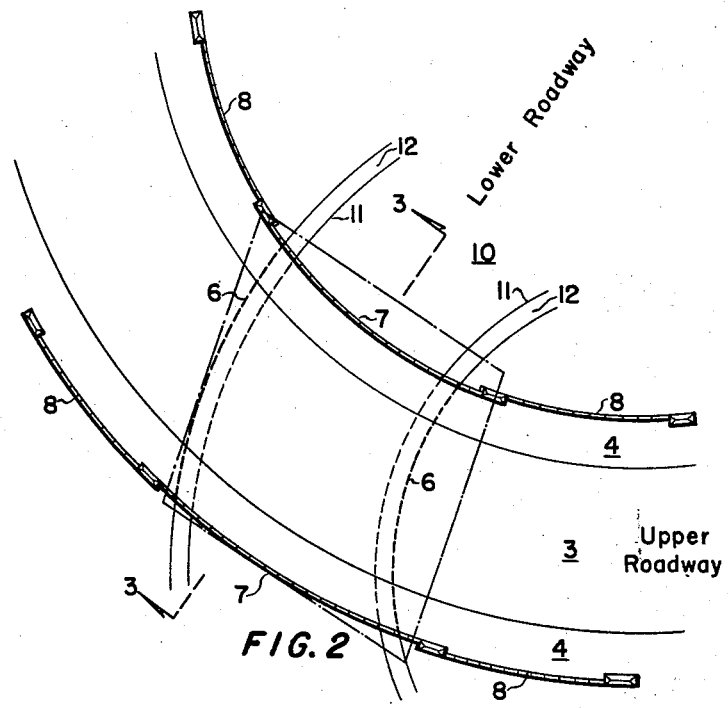
Figure 2 is a schematic representation of the bridge in plan and in addition shows, in dot and dash phantom lines, the parallelogram form or shape of the conventional skewed structure.
Figure 3:
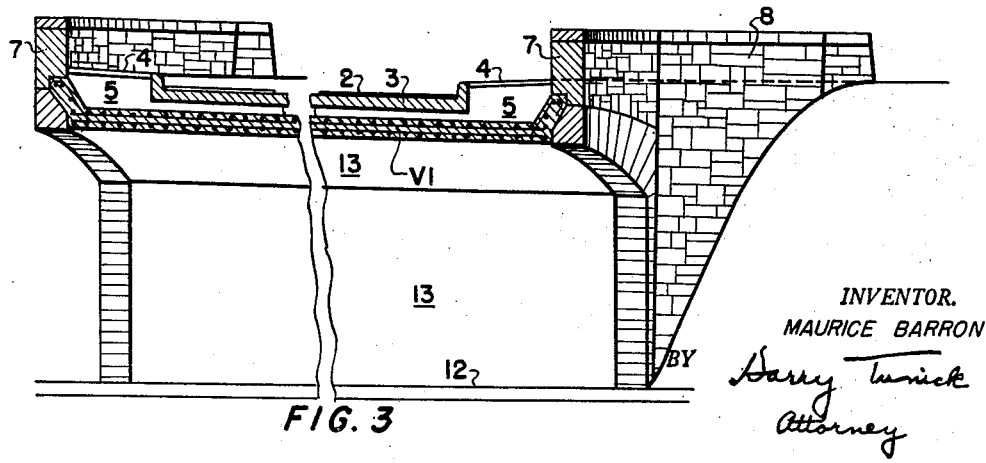
Figure 3 is a sectional detail view taken along the broken line 3—3 on Figure 2 on an enlarged scale.

Having more particular reference to the drawing, in connection with which like characters of reference will designate corresponding parts throughout, the invention when used for bridge, viaduct or similar construction comprises a reinforced concrete vault or barrel VI having an intrados 13 and an extrados 17 (see Figure 12) adapted to directly receive and to carry the paving 2 (Figure 3) of the upper roadway 3 and the upper sidewalks 4, or to carry said roadway 3 and sidewalks 4 through the medium of earth fill 5. Two substantially concentric curved abutment walls or vertical legs 6 (Figure 12) are built monolithic with and support the vault VI. Two substantially parallel or concentric parapet walls 7 (Figures 2 and 3) are adjacent to and connected with the vault VI. Four approach walls 8 (Figure 2) are adjacent to the vault VI. Two substantially concentric foundation footings 9 (Figure 12) are under and built monolithically with the vertical legs 6.

The invention when used as a bridge, viaduct or similar construction results in the separation of grades between the upper roadway 3 (Figure 2) and the curved lower roadway which comprises a curved road pavement 10, two substantially concentric curbs 11, and two substantially concentric sidewalks 12.

Figure 4:
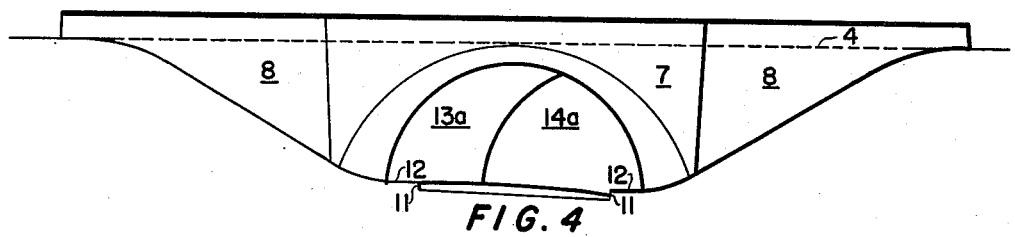
Figure 4 is a schematic representation of a circular arch bridge in elevation.
Figure 5:
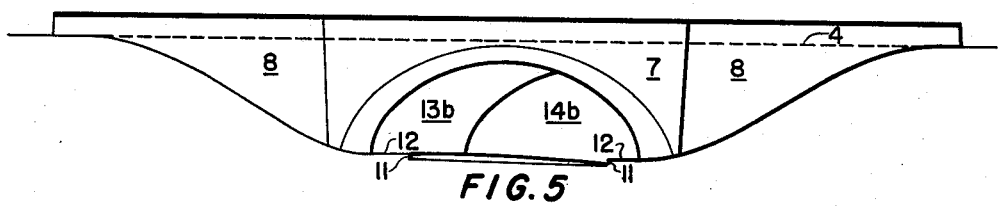
Figure 5 is a schematic representation of an elliptical arch bridge in elevation.
Figure 6:
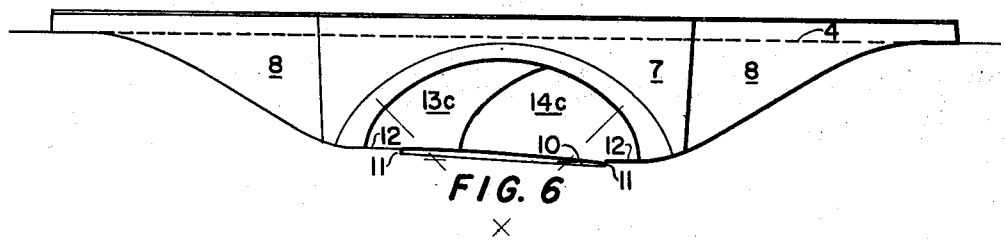
Figure 6 is a schematic representation of a multi-centered arch bridge in elevation.
Figure 7:
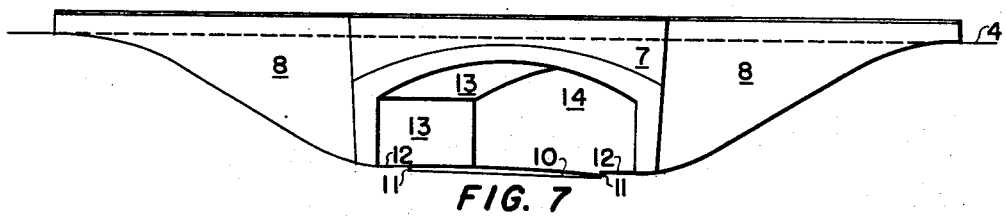
Figure 7 is a schematic representation of a rigid frame bridge in elevation.
Figure 8:
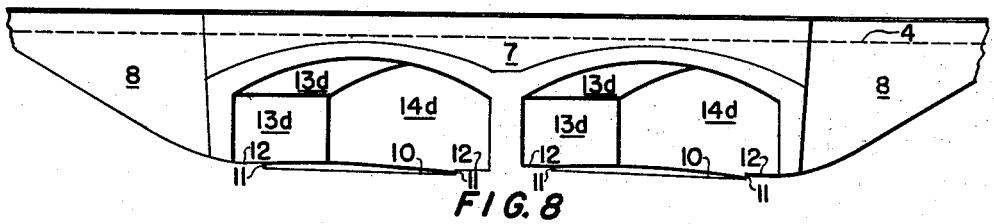
Figure 8 is a schematic representation of a multi-span bridge in elevation. The structure as shown is for a rigid frame bridge opening but any of the several other openings may be used.

The inner surface 13 of the vault VI and the inner surfaces of the vertical legs 6 are commonly called the intrados, and the bridge opening 14 is the shape of the intrados surfaces as seen in elevation. In this invention, the bridge opening 14 may take any of several forms such as the circular shape 14a (see Figure 4), the elliptical shape 14b (see Figure 5), the multi-center shape 14c (see Figure 6), the rigid frame shape 14 (see Figure 7), or multiple span combination of shapes such as shape 14d as shown in Figure 8.

The intrados (see Figure 9) substantially results from a combination of surfaces of revolution which are formed by revolving the bridge opening 14 about an axis of revolution 15 which is substantially vertical and located at or near the center of curvature 16 of the lower curved roadway 10.

Figure 12:
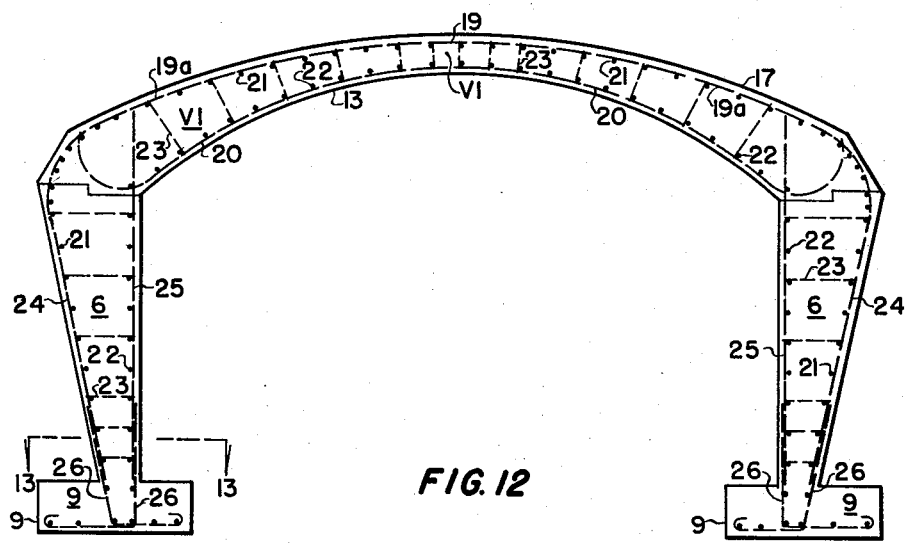
Figure 12 is a schematic representation of a sectional detail view showing the system of bars used to reinforce the concrete.
Figure 13:
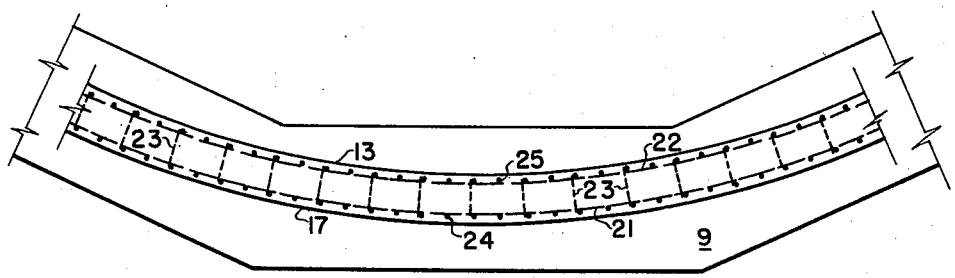
Figure 13 is a sectional detail view taken along the broken line 13—13 on Figure 12.

Similarly, as shown in Figure 9, the outer surface 17 (see Figure 12) of the vault VI and outer surfaces of the vertical legs 6 are called the extrados. In the invention, this extrados 17 is substantially formed by combinations of surfaces of revolution 17, the axis 15 of which is the same as the axis 15 of the intrados. Any radial section 18 (Figure 9) will, therefore, always cut the same geometric shape for the intrados and for the extrados. Figure 12 represents such a radial section. It will be observed, from the mode of construction of my improved bridge, the face or opening of the bridge makes a different skew angle with a radial section through each point along the axis of the bridge. That is, the skew angle of the bridge varies from point to point along the axis of the bridge. From this it will be seen that any successive radial sector of the bridge of my invention has a different skew from adjacent radial sectors. In other words, in my bridge, as one goes from point to point along the axis of the bridge, the skew angle varies from radial element, sector or segment to the next radial element, sector or segment.

The longitudinal reinforcing bars 19 (Figures 12 and 14) are embedded in the concrete close to the extrados and parallel thereto. Close to the intrados and parallel thereto are imbedded the longitudinal reinforcing bars 20 (see Figures 12 and 15). Concentric transverse reinforcing bars 21 (Figures 12 and 14) are placed to properly space the longitudinal reinforcing bars 19 in the extrados pattern. Concentric transverse reinforcing bars 22 (see Figures 12 and 15) are placed to properly space the longitudinal reinforcing bars 20 in the intrados pattern. The extrados and intrados patterns of reinforcing bars are held the proper distance apart at several points along the vault VI and legs 6 by cross tie bars 23 (see Figure 12) commonly called stirrups.

Figure 14:
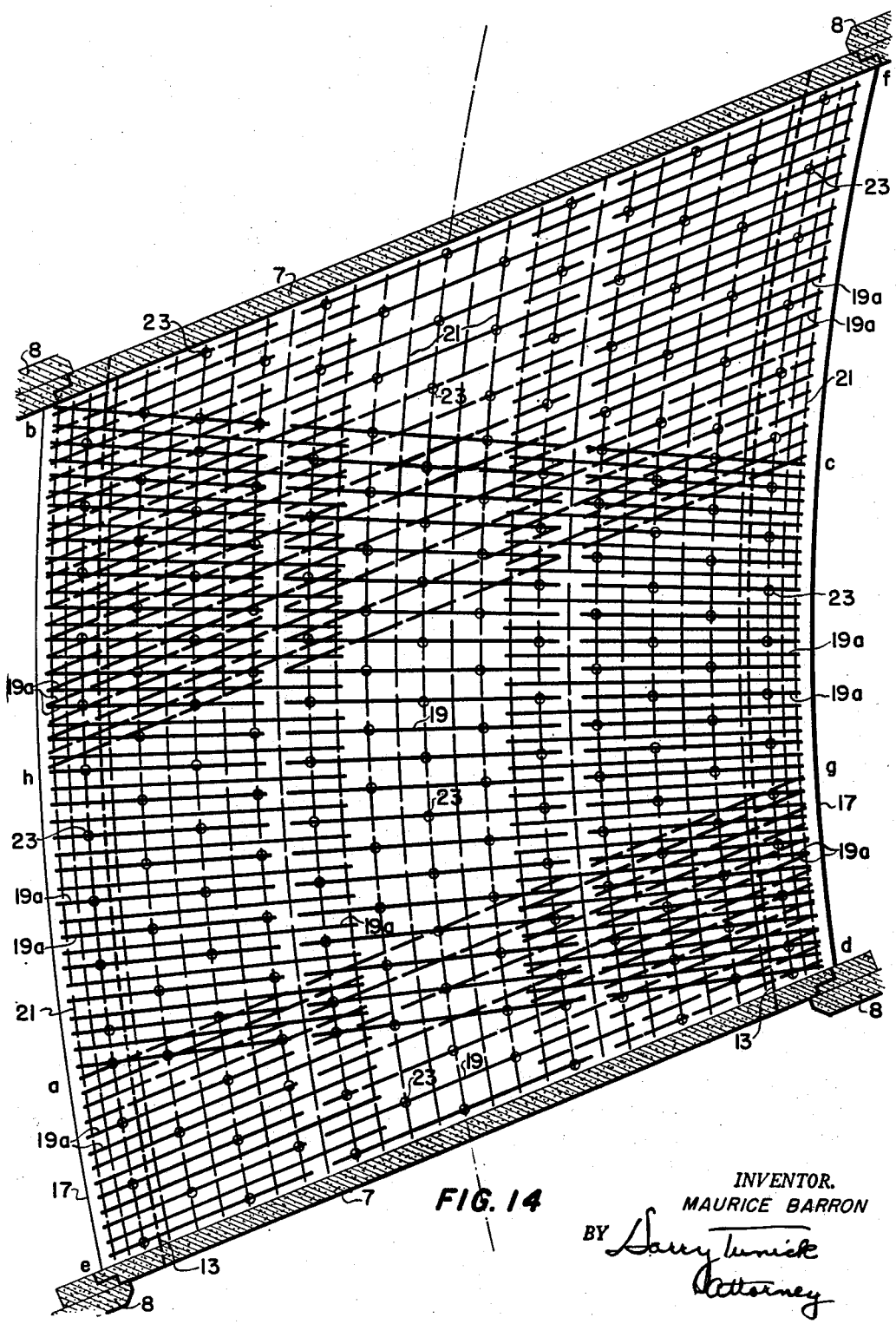
Figure 14 is a schematic representation of the upper (extrados) bar pattern, and shows the system of reinforcing bars near the upper surface of the vault.

Figure 14 represents a preferred embodiment of the extrados pattern of reinforcing bars 19 near the extrados 17 of the vault VI. It should be noted that a greater number of bars 19 and 19a are employed at areas of greater tensile stress.

Figure 15:
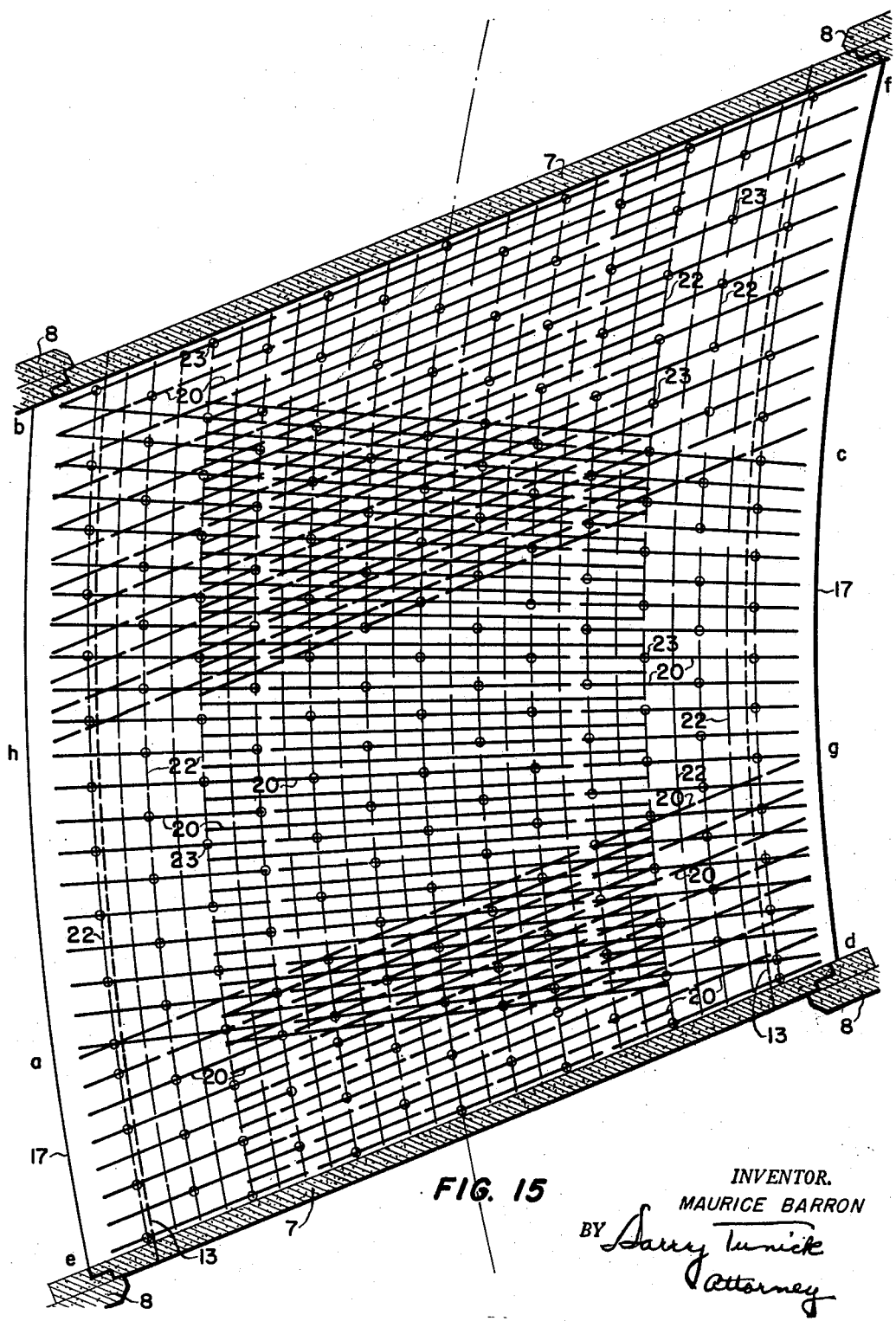
Figure 15 is a schematic representation of the lower (intrados) bar pattern and shows the system of reinforcing bars near the lower surface of the vault.

Figure 15 represents the intrados bar pattern which corresponds to the extrados bar pattern shown in Figure 14. This preferred embodiment of bar patterns efficiently and economically satisfies the stress and strain requirements of this new type of highway structure. The pattern for the vault may be considered as comprised of a segmen of an annulus *abcd*, and two distorted parallelograms *eagd* and *hbfc*. The two parallelograms overlap the segment *abcd* forming two overlap circular sectors *adg* and *bch*. These overlap sectors are areas of increased strength. Furthermore, the increase in strength is gradual from the apex *a* to the base *dg* of the sector *adg*, and from the apex *c* to the base *hb* of the sector *bch*. Structural analysis will show that the sectors *adg* and *bch* of increased strength approximately correspond to areas of increased stress. A maximum number of bars are the same length, same size and same shape. The pattern of bars, as shown in the embodiment, is, therefore, a very efficient one simplifying construction and minimizing constructional costs.

In other words, as shown in Figure 14, the shape of my preferred reinforced concrete, variable skew vault, is, in plan generally a quadrilateral *e, b, f, d*. Two opposing sides *e, a, h, b* and *d, g, c, f* of the quadrilateral are curved and concentric. The other two opposing ends or sides *b, f* and *e, d* of the quadrilateral *e, b, f, d* are substantially parallel lines. The reinforcing rods 19 in the central portion of the vault are arranged radially relative to the curved in plan side walls *e, a, h, b* and *d, g, c, f*, which have a common center of curvature. Additional reinforcing rods 19a in said vault are arranged in two groups *h, b, f, c* and *e, a, g, d*, the rods of said latter groups being arranged adjacent to and parallel to the ends *b, f* and *e, d* of the vault. As shown, the parallely arranged rods in the groups *h, b, f, c* and *e, a, g, d* overlap the radially arranged rods in the annular sector *a, b, c, d* at areas of relatively increased stress.

Other patterns are possible by varying the limits of the segment *abcd*, the parallelogram *eagd*, the parallelogram *hbfc*, or appropriate parts of these components. Thus, in the limit the radial pattern may be used throughout as shown in Figures 20, 20A and 20B or the parallelogram pattern may be used exclusively as shown in Figures 21 and 21A. The former pattern (Figures 20, 20A and 20B) results in excessive cutting and fitting of bars in the sectors *stu* and *vwx*. The latter pattern (Figures 21 and 21A) results in the reinforcing bars being turned away from the most efficient direction, namely, the direction used in the radial pattern. Figure 22 shows still another arrangement for the bars which is a cross between Figures 20 and 21.

In Figures 20, 20A, 20B, 21, 21A and 22 only the longitudinal bars are schematically shown. The transverse bars and the stirrups are omitted for clarity.

The pattern of the extrados rods 24 in the legs 6 (Figure 12) is governed by the pattern of the extrados rods 19 in the vault. In fact, some of the extrados vault rods 19a (Figures 14 and 12) are the extensions of the extrados rods 24 from the legs 6. The pattern of intrados rods 25 of the legs is governed by the pattern of the extrados rods 24 of the legs since it is necessary to tie the two patterns together by the stirrups 23 (Figure 12).

Figures 17, 18:
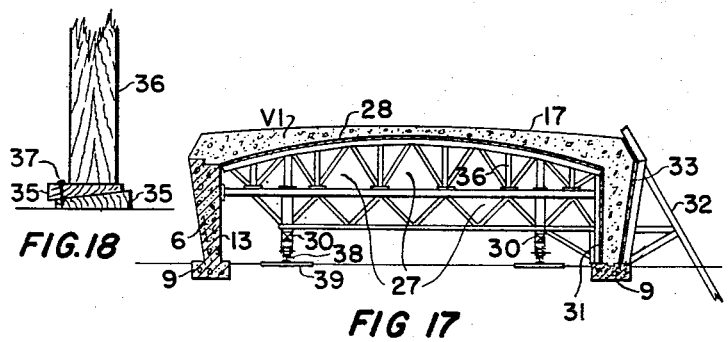
Figure 17 is a sectional detail view taken along the broken line 17—17 of Figure 16, and shows schematically the system of movable arch centering and form work placed on the curved track.
Figure 18 is a detail, to a large scale, of the adjusting wedges placed under each vertical post of the arch centering.
Figure 19:
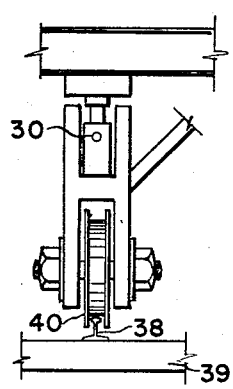
Figure 19 is a schematic representation of the curved track, wheel and jacking arrangement for moving, lowering and raising the arch centering.

In the embodiment shown on Figures 12 and 17, the structure is founded on a spread footing 9 which rests on soil. The footing 9 is built monolithically with the legs 6, and firmly tied to said legs 6 by means of the rods 26 (Figure 12) which are commonly called dowels. These dowels 26 may be bent into the footings 9 as shown in Figure 12 to form reinforcement for the footings 9. These dowels may also take the shape of a U with one of the legs used as an intrados rod, and the other leg as an extrados rod. The U shaped dowels are expedient when the structure is founded on rock in which case the footing need only be slightly wider than the bottom of the leg 6. When the rigid frame bridge or arch is considered hinged at the bases of the legs, an articulated hinge may be approximated by crossing the dowel bars at the hinge point.

Figure 16:
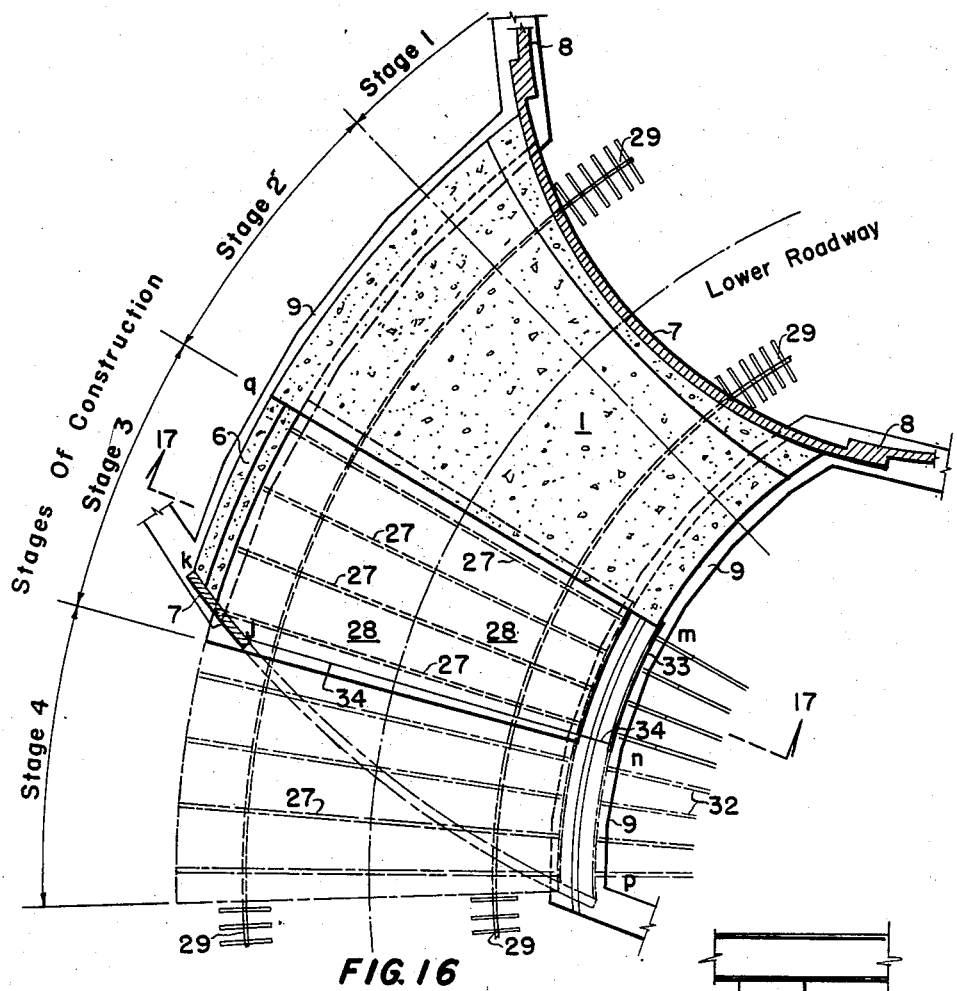
Figure 16 is a schematic representation showing three stages in the construction of a variable skew rigid frame bridge.

The embodiment as shown in Figures 16, 17, 18 and 19 demonstrates a preferred method of construction. The falsework frames 27 are radially spaced (Figure 16) to receive the form boards 28 (Figure 17) of the vault intrados 13. The falsework frames 27 are supported on the concentric curved tracks 29 through a jacking system 30 which raises and lowers the frames 27 and forms 28. The upper half of Figure 16 shows two stages of construction completed. The centering frames 27 and form boards 28 have been positioned for the third stage, i. e. the third pour of concrete. For reasons of clarity no reinforcing rods are shown. Two variations in construction are shown in Figures 16 and 17. In the first variation, the left leg 6 of the structure is shown as built previously and independently of the arch centering 27. In this instance the centering 27 and forms 28 are used to construct only the vault VI.

In the second variation, the arch centering and form work includes the vertical forms 31 for the intrados of the right leg 6 as an integral part of the centering system which travels on the curved track 29 and wheel 40. The extrados form work, in this instance, consists of a system of braces 32 (Figure 17) which support the extrados form boards 33. For the third stage of construction, part of the parapet wall 7 (Figure 16) is shown completed. This portion of the parapet wall 7 together with a bulkhead 34, as shown in Figure 16, limits the stage of construction to the area *jkqmn*. After the concrete has been poured for this stage and has hardened sufficiently, the jacks 30 are lowered and the centering and forms moved along the curved track 29 to the final stage which is shown in phantom lines on Figure 16.

For the final stage, the bulkhead 34 (Figure 16) is removed, the parapet wall 7 completed, and additional outside forms 33 placed and braced as required. The wedges 35 under each post 36 of the arch centering trusses 27 are wedged tight to the proper elevation and spikes 37 are driven to hold the position. The final concrete pour is made in the area *pjn* of Figure 16. The curved track 29 may consist of standard rails 38 (Figure 19) bent to the proper radii and supported on standard railroad ties 39, or by other suitable means. The centering system (Figure 17) in being positioned, rolls along the curved rail 38 on the wheels 40.

It should be noted that if an elliptical generating element is cut by a radial plane to form one face of the bridge the bridge opening in elevation will also be an ellipse. If the cutting plane is not radial, however, the bridge opening is not an ellipse. The more the cutting plane is skewed from a radial one the greater will be the deviation from an ellipse. For excessively skewed cutting planes the distortion becomes pronounced and readily discernible. This distorted egg shaped opening is a fourth power oval when the generating element is an ellipse. Frequently there is an architectural and aesthetic objection to such distorted openings.

The following method will result in any predetermined bridge opening, and, therefore, may be used in the above instance to give a truly elliptical bridge opening. By proper mathematical transformation it is possible to derive the equation of a generating element (the radial trace) which after being revolved about the generating axis and the resulting surface of revolution cut by the desired skewed cutting plane, will result in the predetermined bridge opening. Thus in the above elliptical bridge opening the generating element will be a fourth power oval. The appearance of this oval on the inside of the structure is of no consequence. It is to be noted that, in most bridges, only one face becomes greatly distorted and that predetermining the shape of this face will adversely affect the other face but to a lesser degree. The best solution will, therefore, be a compromise which will average the distortion in the two faces. This can be accomplished by a transform to the average of the skew of the two faces.

At this point, it may be pointed out that the footings and abutment walls may be truly concentric or built on short chords of substantially concentric curves, that these curves may be compounded to be concentric with the lower curved roadway, and that all vertical surfaces which have been described as curves concentric with the lower roadway may be similarly treated as short chords.

It is to be understood that my invention contemplates the usage of any geometric figure as the generating elements whereby the resulting surfaces of revolution directly form the extrados and intrados of the structure, or indirectly form the same by means of short chords along the surfaces of revolution. This short chord construction may be used for footings, vault parapet walls and supporting walls such as abutment walls and center piers.

It is to be further understood that my invention contemplates the use of pile foundations or other like supporting members such as caissons. It is to be further understood that my invention contemplates the usage of stone faced surfaces or facing of other materials such as metal or plastic.

Manifestly, the construction shown is capable of further modification and such modification is within the scope of my invention.

I claim:

1. A reinforced concrete, variable skew vault, the shape of said vault in plan being generally quadrilateral, two opposing sides of said quadrilateral being substantially concentric curves having a common center of curvature and the other two opposing ends or sides of said quadrilateral being substantially parallel lines; reinforcing rods in the central portion of said vault being arranged radially relative to the curved-in-plan side walls and between a pair of diagonally opposite corners thereof and additional reinforcing rods in said vault in two groups, the rods of each of said groups being arranged adjacent to and parallel to the ends of the vault which are substantially parallel lines, said parallelly arranged rods overlapping the radially arranged rods at areas of relatively increased stress.

2. A variable skew, barrel arch bridge comprising a curved-in-plan upper deck or vault, the shape of said vault in plan being generally quadrilateral, two opposing sides of said quadrilateral being substantially concentric curves having a common center of curvatures and the other two opposing sides being substantially parallel lines; relatively spaced curved-in-plan abutment walls extending throughout and below and supporting said vault or deck; a plurality of relatively spaced reinforcing rods forming predetermined patterns, one group of reinforcing rods being arranged radially relative to the curved sides of the vault, two other groups of said reinforcing rods being arranged parallel to each other and to the parallel sides of said vault so as to form, substantially, two parallelograms, the rods arranged radially overlapping the rods arranged in said parallelograms, said reinforcing rods extending throughout the said vault and into said abutment walls, a plurality of relatively spaced reinforcing rods forming sections of concentric rings in the extrados and intrados of and extending into said abutment walls; a plurality of relatively spaced normally disposed stirrups of reinforcing metal extending from extrados to intrados rods for tying and holding together reinforcing rods of said extrados and intrados.

3. A variable skew highway bridge comprising a curved-in-plan upper deck or vault, the shape of said vault in plan being generally quadrilateral, two opposing sides of said quadrilateral being substantially concentric curves having a common center of curvature and the other two opposing sides being substantially parallel lines; relatively spaced curved-in-plan abutment walls extending throughout and below and supporting said deck or vault, one or more relatively spaced curved-in-plan footings extending throughout and below and supporting said walls, a plurality of relatively spaced longitudinally disposed reinforcing rods forming concentric arcs in the extrados and intrados of said vault, a plurality of spaced reinforcing rods lying along different radii of said curved sides and in the extrados and intrados of said vault and extending into said abutment walls, and a plurality of straight reinforcing rods arranged parallel to each other and to the parallel sides of said vault and in said intrados and extrados, the ends of said rods being bent to extend into said abutment walls, said parallely arranged rods and said radially arranged rods overlapping at a pair of substantially diagonally opposite areas in said quadrilaterally shaped vault.

4. A monolithic, reinforced concrete, variable skew, barrel arch or rigid frame bridge, having independent, crossing upper and lower roadways, said bridge comprising a plurality of spaced supporting walls being curved in plan and substantially concentric, and a curved-in-plan vault integral with and carried by said supporting walls, any successive radial sector of said bridge having a different skew from adjacent radial sectors.

5. A monolithic variable skew, barrel arch or rigid frame bridge, having independent, crossing upper and lower roadways, said bridge also comprising opposed curved-in-plan parapet structures, a curved-in-plan upper deck or vault extending throughout, below and supporting said parapet structures; relatively spaced curved-in-plan abutment walls extending throughout and below, and supporting said vault; and relatively spaced curved-in-plan foundation footings extending throughout and below and supporting said abutment walls, any successive radial sector of said bridge having a different skew from adjacent radial sectors.

6. A monolithic variable skew, barrel arch or rigid frame bridge, having independent, crossing upper and lower roadways, said bridge comprising opposed parapet walls, a curved-in-plan upper deck or vault extending throughout and below said parapet walls; relatively spaced curved-in-plan abutment walls extending throughout, below and supporting said deck or vault; one or more relatively spaced curved-in-plan piers between said abutment walls extending throughout and below, and supporting said vault; and relatively spaced curved-in-plan foundation footings extending throughout and below, and supporting said abutment walls and said intermediate pier or piers, any successive radial sector of said bridge having a different skew from adjacent radial sectors.

7. A monolithic reinforced concrete variable skew, barrel arch or rigid frame highway bridge having independent, crossing upper and lower roadways, said bridge comprising a curved-in-plan road supporting vault and a plurality of spaced abutment walls supporting said vault, the intrados and curvature of the inner surfaces of said abutment walls being determined by rotating a predetermined desired bridge opening about a substantially vertical generating axis, any successive radial sector of said bridge having a different skew from adjacent radial sectors.

References Cited in the file of this patent

UNITED STATES PATENTS

| Number | Name | Date |
| --- | --- | --- |
| 1,017,029 | Williams et al. | Feb. 13, 1912 |
| 1,277,186 | Brynoldt | Aug. 27, 1918 |
| 1,634,548 | Luten | July 5, 1927 |
| 1,697,598 | Hewes | Jan. 1, 1929 |
| 1,959,653 | Barzaghi | May 22, 1934 |
| 2,308,334 | Luke | Jan. 12, 1943 |

OTHER REFERENCES

Engineering News Record, Sept. 12, 1940, page 334.

Engineering News Record, Nov. 19, 1942, page 63.

Engineering News Record, page 85, May 16, 1946.